(12) United States Patent  
Zhang et al.

(10) Patent No.: US 9,148,580 B2
(45) Date of Patent: Sep. 29, 2015

(54) TRANSFORMING WIDE DYNAMIC RANGE IMAGES TO REDUCED DYNAMIC RANGE IMAGES

(71) Applicant: Texas Instruments Incorporated, Dallas, TX (US)

(72) Inventors: Buyue Zhang, Plano, TX (US); Aziz Umit Batur, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 14/309,892

(22) Filed: Jun. 20, 2014

(65) Prior Publication Data

US 2015/0023594 A1    Jan. 22, 2015

Related U.S. Application Data

(60) Provisional application No. 61/846,877, filed on Jul. 16, 2013.

(51) Int. Cl.
*G06K 9/00* (2006.01)
*H04N 5/235* (2006.01)
*H04N 3/14* (2006.01)

(52) U.S. Cl.
CPC ............ *H04N 5/235* (2013.01); *H04N 3/155* (2013.01)

(58) Field of Classification Search
USPC ........ 382/274, 260, 263, 264, 276, 162, 167; 348/51, 54, 222.1, E5.031, E13.023; 345/163, 419; 358/3.26, 3.27
See application file for complete search history.

(56) References Cited

U.S. PATENT DOCUMENTS

| | | |
|---|---|---|
| 7,899,267 B2 * | 3/2011 | Dvir .............................. 382/274 |
| 8,385,671 B1 | 2/2013 | Batur |
| 2014/0152686 A1 | 6/2014 | Narasimha et al. |
| 2014/0152694 A1 | 6/2014 | Narasimha et al. |

* cited by examiner

*Primary Examiner* — Anh Do
(74) *Attorney, Agent, or Firm* — Mima Abyad; Frank D. Cimino

(57) ABSTRACT

A method of transforming an N-bit raw wide dynamic range (WDR) Bayer image to a K-bit raw red-green-blue (RGB) image wherein N>K is provided that includes converting the N-bit raw WDR Bayer image to an N-bit raw RGB image, computing a luminance image from the N-bit raw RGB image, computing a pixel gain value for each luminance pixel in the luminance image to generate a gain map, applying a hierarchical noise filter to the gain map to generate a filtered gain map, applying the filtered gain map to the N-bit raw RGB image to generated a gain mapped N-bit RGB image, and downshifting the gain mapped N-bit RGB image by (N−K) to generate the K-bit RGB image.

15 Claims, 4 Drawing Sheets

TRANSFORMING WIDE DYNAMIC RANGE IMAGES TO REDUCED DYNAMIC RANGE IMAGES

CROSS-REFERENCE TO RELATED APPLICATIONS

This application claims benefit of U.S. Provisional Patent Application Ser. No. 61/846,877 filed Jul. 16, 2013, which is incorporated herein by reference in its entirety.

BACKGROUND OF THE INVENTION

1. Field of the Invention

Embodiments of the present invention generally relate to transforming wide dynamic range images to reduced dynamic range images.

2. Description of the Related Art

The dynamic range of natural scenes can exceed three orders of magnitude. Camera sensors, especially the new wide dynamic range (WDR) sensors, can capture this range, providing a more natural image representation similar with the human vision system. WDR images, also referred to as high dynamic range (HDR) images, can achieve higher image quality due to a dynamic range that exceeds the more traditional 8, 10 and 12-bit images. Note that the term "dynamic range" described the ratio between the maximum and minimum measurable light intensities and is typically expressed as a bit depth in digital cameras and other devices. When WDR images are displayed on commonly used display devices, the images appear to be over-exposed in well-lighted scenes under-exposed in dark scenes. For example, display devices such as liquid crystal display (LCD) devices are limited to a dynamic range of roughly one to two orders of magnitude. Thus, details are lost when the images are displayed on such display devices. Typically, a tone mapping algorithm is used to adapt WDR images to the lower dynamic range of whatever display device is used.

SUMMARY

Embodiments of the invention relate to methods, apparatus, and computer readable media for transforming wide dynamic range images to reduced dynamic range images. In one aspect, a method of transforming an N-bit raw wide dynamic range (WDR) Bayer image to a K-bit raw red-green-blue (RGB) image wherein N>K is provided that includes converting the N-bit raw WDR Bayer image to an N-bit raw RGB image, computing a luminance image from the N-bit raw RGB image, computing a pixel gain value for each luminance pixel in the luminance image to generate a gain map, applying a hierarchical noise filter to the gain map to generate a filtered gain map, applying the filtered gain map to the N-bit raw RGB image to generated a gain mapped N-bit RGB image, and downshifting the gain mapped N-bit RGB image by (N−K) to generate the K-bit RGB image.

In one aspect, an apparatus configured to transform an N-bit raw wide dynamic range (WDR) Bayer image to a K-bit raw red-green-blue (RGB) image wherein N>K is provided that includes means for converting the N-bit raw WDR Bayer image to an N-bit raw RGB image, means for computing a luminance image from the N-bit raw RGB image, means for computing a pixel gain value for each luminance pixel in the luminance image to generate a gain map, means for applying a hierarchical noise filter to the gain map to generate a filtered gain map, means for applying the filtered gain map to the N-bit raw RGB image to generated a gain mapped N-bit RGB image, and means for downshifting the gain mapped N-bit RGB image by (N−K) to generate the K-bit RGB image.

In one aspect, a computer readable medium is provided, the computer readable medium storing software instructions that, when executed by at least one processor, cause a method of transforming by a digital system an N-bit raw wide dynamic range (WDR) Bayer image to a K-bit raw red-green-blue (RGB) image wherein N>K to be performed. The method includes converting the N-bit raw WDR Bayer image to an N-bit raw RGB image, computing a luminance image from the N-bit raw RGB image, computing a pixel gain value for each luminance pixel in the luminance image to generate a gain map, applying a hierarchical noise filter to the gain map to generate a filtered gain map, applying the filtered gain map to the N-bit raw RGB image to generated a gain mapped N-bit RGB image, and downshifting the gain mapped N-bit RGB image by (N−K) to generate the K-bit RGB image.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
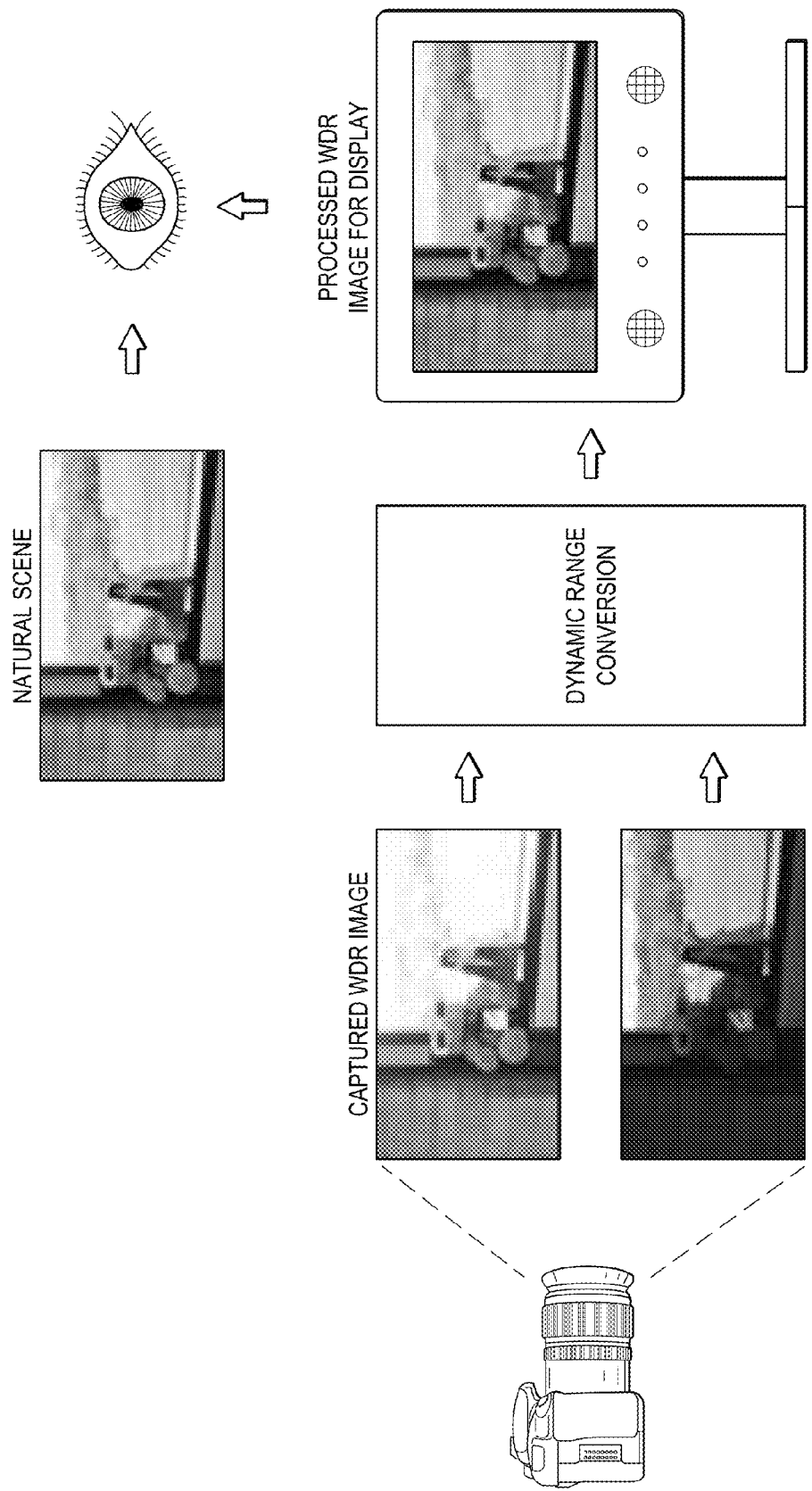
FIG. 1 is an example illustrating the concept of transforming a wide dynamic range (WDR) raw Bayer image to a reduced dynamic range raw red-green-blue (RGB) image.

Specific embodiments of the invention will now be described in detail with reference to the accompanying figures. Like elements in the various figures are denoted by like reference numerals for consistency. As used herein, an image may be a single still picture of a scene or may be a frame in a video stream.

In general, embodiments of the invention provide for transforming wide dynamic range (WDR) images to reduced dynamic range images for display on a lower dynamic range display device. More specifically, as illustrated in the example of FIG. 1, the dynamic range of raw WDR Bayer images is reduced to a lesser dynamic range, e.g., that of a display device, while matching the visual appearance of the scene. The WDR images may be generated, for example, by a WDR sensor or by merging of multiple images captured by a lower dynamic range imaging sensor. In the example of FIG. 1, the captured WDR image is generated using multiple exposures and is transformed to the reduced dynamic range while matching the visual appearance of the natural scene.

Embodiments are described assuming the WDR images are captured by an N-bit WDR sensor. One of ordinary skill in the art will understand embodiments in which the WDR images are generated by combining multiple exposures.

Figure 2:
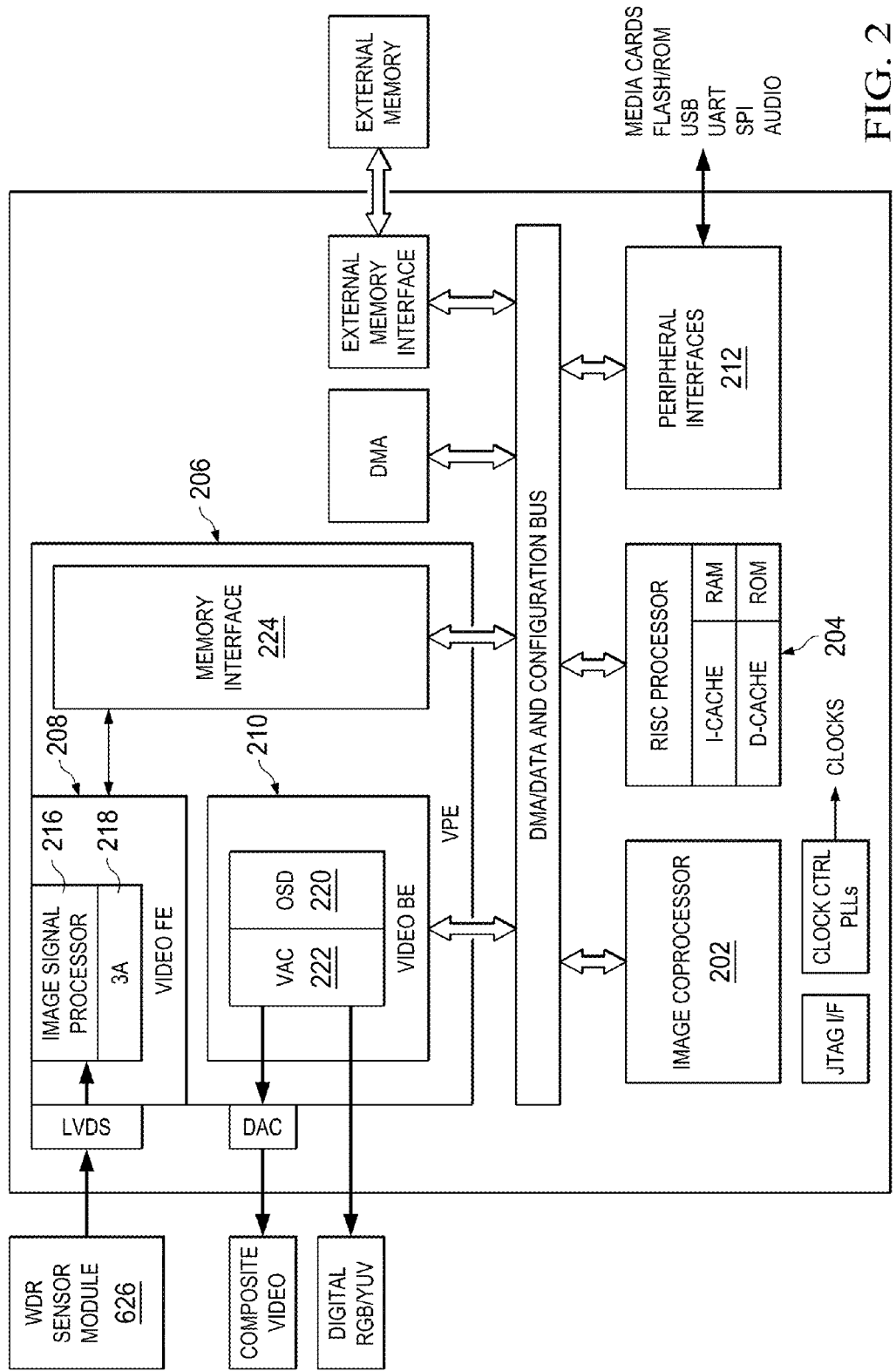
FIG. 2 is a block diagram of an example digital system configured to transform an N-bit raw WDR Bayer image to a K-bit raw RGB image.

FIG. 2 shows an example digital system suitable for an embedded system (e.g., a digital camera) configured to transform an N-bit raw WDR Bayer image to a K-bit RGB image (N>K) as described herein. The digital system includes a DSP-based image coprocessor (ICP) 202, a RISC processor 204, and a video processing engine (VPE) 206 that may be configured to perform noise filtering as described herein. The RISC processor 204 may be any suitably configured RISC processor. The VPE 206 includes a configurable video processing front-end (Video FE) 208 input interface used for video capture from imaging peripherals such as image sensors, video decoders, etc., a configurable video processing back-end (Video BE) 210 output interface used for display devices such as SDTV displays, digital LCD panels, HDTV video encoders, etc, and memory interface 224 shared by the Video FE 208 and the Video BE 210. The digital system also includes peripheral interfaces 212 for various peripherals that may include a multi-media card, an audio serial port, a Universal Serial Bus (USB) controller, a serial port interface, etc.

The Video FE 208 includes an image signal processor (ISP) 216, and a 3A statistics generator 218. The ISP 216 provides an interface to image sensors and digital video sources. More specifically, the ISP 216 may accept raw image/video data from a WDR sensor module 226 (e.g., CMOS or CCD) and can accept YUV video data in numerous formats. The ISP 216 also includes a parameterized image processing module with functionality to generate image data in a color format (e.g., RGB) from raw sensor data. The ISP 216 is customizable for each sensor type and supports video frame rates for preview displays of captured digital images and for video recording modes. The ISP 216 also includes, among other functionality, an image resizer, statistics collection functionality, and a boundary signal calculator. The 3A module 218 includes functionality to support control loops for auto focus, auto white balance, and auto exposure by collecting metrics on the raw image data from the ISP 216 or external memory. In one or more embodiments, the Video FE 208 is configured to perform a method for transforming N-bit raw WDR Bayer images to K-bit RGB images (N>K) as described herein.

The Video BE 210 includes an on-screen display engine (OSD) 220 and a video analog encoder (VAC) 222. The OSD engine 220 includes functionality to manage display data in various formats for several different types of hardware display windows and it also handles gathering and blending of video data and display/bitmap data into a single display window before providing the data to the VAC 222 in a color space format (e.g., RGB, YUV, YCbCr). The VAC 222 includes functionality to take the display frame from the OSD engine 220 and format it into the desired output format and output signals required to interface to display devices. The VAC 222 may interface to composite NTSC/PAL video devices, S-Video devices, digital LCD devices, high-definition video encoders, DVI/HDMI devices, etc.

The memory interface 224 functions as the primary source and sink to modules in the Video FE 208 and the Video BE 210 that are requesting and/or transferring data to/from external memory. The memory interface 224 includes read and write buffers and arbitration logic.

The ICP 202 includes functionality to perform the computational operations required for compression and other processing of captured images. The video compression standards supported may include, for example, one or more of the JPEG standards, the MPEG standards, the H.26x standards, and the emerging HEVC standard. In one or more embodiments, the ICP 202 may be configured to perform at least some of the computational operations of transforming a WDR image to a lesser dynamic range image.

The WDR sensor module 226 is configured to capture WDR Bayer images of a scene and provides these images to the VPE 206 at a suitable frame rate, e.g., 30 frames per second (fps). The WDR sensor module 226 includes one or more suitable imaging sensors, e.g., CCD (charge-coupled device) or CMOS (complementary metal oxide semi-conductor) sensors.

In operation, a raw WDR Bayer image of a scene is captured by the WDR sensor module 224 and provided to the video FE 208. The video FE 208 transforms the WDR image to the input format needed to perform video compression. Prior to the compression, the raw WDR Bayer image may be transformed to an RGB image with a lesser dynamic range as described herein as part of processing the image in the video FE 208. The video data generated by the video FE 208 is stored in the external memory. The video data is then encoded, i.e., compressed. During the compression process, the video data is read from the external memory and the compression computations on this video data are performed by the ICP 202. The resulting compressed video data is stored in the external memory. The compressed video data is then read from the external memory, decoded, and post-processed by the video BE 210 to display the image/video sequence.

Figure 3:
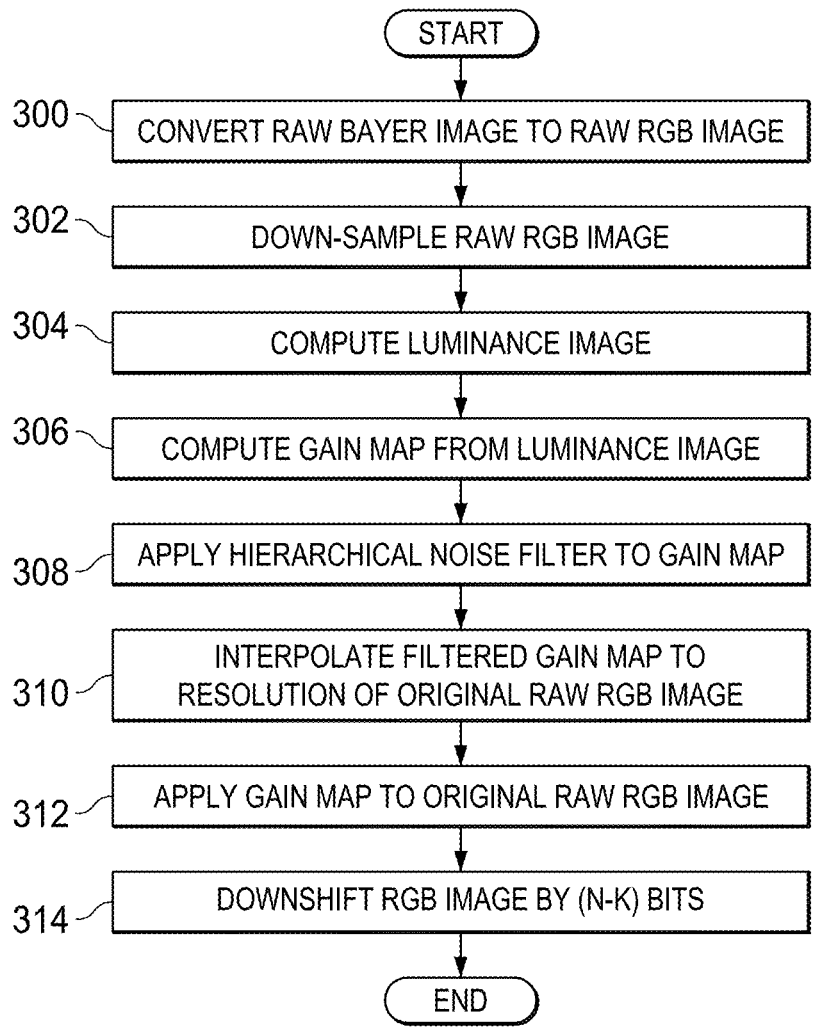
FIG. 3 is a flow diagram of a method for transforming an N-bit raw WDR Bayer image to a K-bit raw RGB image.

FIG. 3 is a flow diagram of a method for transforming an N-bit raw WDR Bayer image to a K-bit raw RGB image (N>K) that may be performed, for example, by the digital system of FIG. 2. For simplicity of explanation, the WDR image is assumed to be a 1440×2560 raw Bayer image. One of ordinary skill in the art will understand embodiments in which the WDR image size is larger or smaller.

As shown in FIG. 3, initially, the raw WDR Bayer image is transformed 300 to a raw red-green-blue (RGB) image which may be smaller than the WDR Bayer image. This conversion may be performed, for example, by forming an RGB pixel value from each 2×2 block of Bayer data, where the R and B are the R and B values in the 2×2 Bayer block, respectively, and the G value is the average of the Gr and Gb values in the 2×2 Bayer block. The resulting RGB image is hence reduced by half in both the horizontal and vertical dimensions. Thus, the 1440×2560 raw Bayer image becomes a 720×1280 raw RGB image.

The raw RGB image is then down-sampled 302 to reduce the amount of data to be processed. For example, a 2× down-sampling may be applied to the RGB image to reduce the size from 720×1280 to 368×640. A luminance image is then computed 304 from the down-sampled RGB image. A standard RGB to YCbCr conversion may be used to compute the luminance image Y from the down-sampled RGB image.

A gain map is then computed 306 from the luminance image. More specifically, a pixel gain value for each pixel of the N-bit luminance image is computed. Any suitable gain function may be used that smoothly applies bigger gains to dark pixels and smaller gains to light pixels. In some embodiments, the pixel gain values are computed as per the gain function:

$$\text{pixelGain} = ((\text{inputPixel}+1)/\text{maxPix})^t / ((\text{inputPixel}+1)/\text{maxPix})$$

where inputPixel is the input luminance pixel value, t is an experimentally determined tuning parameter, and maxPix is $2^N$. If the pixelGain is larger than an experimentally determined value MAX_GAIN, pixelGain is set to MAX_GAIN in the gain map. In some embodiments, t=0.1 and MAX_GAIN=60.

Hierarchical noise filtering is then applied to the gain map to filter 308 edges in the map, resulting in a filtered gain map. The hierarchical noise filtering provides selective edge-preserving smoothing, i.e., after the filtering, the relatively weak edges are destroyed, while the relatively strong edges are preserved and maintain their sharpness. The assumption is that after the pre-processing of steps 300-306, any relatively weak edges in the gain map are textures in a constant illumination region, while the strongest edges are true illumination edges. Any suitable hierarchical noise filter may be used that suppresses unwanted (weak) edges in a constant illumination region while preserving strong illumination edges, thus helping to maintain local contrast in the final WDR output image. Some examples of suitable hierarchical noise filters include multi-level Gaussian noise filters.

In some embodiments, an embodiment of the hierarchical noise filter described in U.S. Pat. No. 8,385,671 entitled "Digital Camera and Method" is used. This patent is incorporated by reference herein in its entirety. In general, embodiments of the hierarchical noise filter include three steps: (1) generating a hierarchical representation of an input array (image) using a simple 2-tap low pass filter fL=[1 1] and a simple 2-tap high pass filter fH=[1 −1], which are modified at a level N of the hierarchical representation by insertion of $2^N-1$ zeros; (2) modifying the coefficients of the arrays at each level of the hierarchy to remove noise, i.e., to suppress weak edges; and (3) creating a noise-filtered image by combining the arrays of the modified hierarchical representation, i.e., by applying the inverse filters fL=[1 1] and fH=[−1 1] (modified at a level N of the hierarchical representation by insertion of $2^N-1$ zeros) to the modified arrays at each level of the modified hierarchical representation. No down-sampling is performed as the hierarchical representation is generated. The modification of the coefficients may be performed by mapping the coefficients with a piecewise linear function or by thresholding the coefficients.

The filtered gain map is then interpolated 310 to the resolution of the original N-bit RGB image, i.e., 720×1280 to generate a full resolution gain map. Any suitable interpolation technique may be used. In some embodiments, bilinear interpolation is used.

The full resolution gain map is then applied 312 to the original N-bit RGB image as per $$I\_fullRes = gainMap\_fullRes \cdot {}^* L_{RGB}$$

where gainMap_fullRes is the full resolution gain map, $L_{RGB}$ is the original N-bit RGB image, and '.*' is a dot product operation that multiplies each value in the gainMap_fullRes by the value in $L_{RGB}$ with the same coordinates to generate I_fullRes. The resulting RGB image is then rounded to an N-bit image. This image is downshifted 314 by (N−K) bits to generate the final K-bit WDR output image, i.e., $$I\_fullRes\_Kb = bitshift(I\_fullRes, N-K).$$

For example, if the image is to be displayed on an 8-bit display device, K=8. The final WDR output image may then be further processed, i.e., the image may be processed in an image pipeline.

Figure 4A:
FIGS. 4A-4D are an example.
Figure 4B:
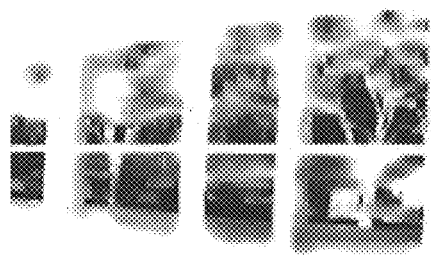
Figure 4C:
Figure 4D:

FIGS. 4A-4D are an example illustrating the efficacy of an embodiment of the method of FIG. 3. FIG. 4A shows the linear raw luminance image with gamma correction applied for display purposes. FIG. 4B shows the noise filtered image. FIG. 4C shows the interpolated gain map with the maximum gain mapped to 255 and the minimum gain mapped to 0 for display purposes. FIG. 4D shows the final WDR output image. Note that in this image details in both the bright region (outside the window) and in the dark region (the person) are apparent.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the RGB image is down-sampled prior to computing the luminance image. One of ordinary skill in the art will understand embodiments in which the down-sampling is not performed.

In another example, embodiments have been described herein in which the raw WDR Bayer image is transformed an RGB image by forming an RGB pixel value from each 2×2 block of Bayer data. One of ordinary skill in the art will understand embodiments in which other algorithms for transforming a Bayer image to an RGB image are used. For example, color filter array (CFA) interpolation, also known as demosaicing, may be used.

In another example, embodiments have been described herein in which pixel gain values are computed as floating point numbers. One of ordinary skill in the art will understand embodiments in which the gain values are computed as fixed point numbers.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of transforming by a digital system an N-bit raw wide dynamic range (WDR) Bayer image to a K-bit raw red-green-blue (RGB) image wherein N>K, the method comprising:
    converting the N-bit raw WDR Bayer image to an N-bit raw RGB image;
    computing a luminance image from the N-bit raw RGB image;
    computing a pixel gain value for each luminance pixel in the luminance image to generate a gain map;
    applying a hierarchical noise filter to the gain map to generate a filtered gain map;
    applying the filtered gain map to the N-bit raw RGB image to generated a gain mapped N-bit RGB image; and
    downshifting the gain mapped N-bit RGB image by (N−K) to generate the K-bit RGB image.

2. The method of claim 1, wherein
    converting the N-bit raw WDR Bayer image comprises forming an RGB pixel value from each 2×2 block of Bayer data in the N-bit raw WDR Bayer image; and
    applying the filtered gain map comprises interpolating the filtered gain map to a resolution of the N-Bit raw RGB image.

3. The method of claim 1, wherein computing a pixel gain value for each luminance pixel comprises computing the pixel gain value as per $((inputPixel+1)/2^N)^t/((inputPixel+1)/2^N)$, wherein inputPixel is a value of the luminance pixel and t is an experimentally determined tuning parameter, and wherein when the pixel gain value is larger than an experimentally determined maximum gain value, the pixel gain value is set to the maximum gain value.

4. The method of claim 1, wherein applying a hierarchical noise filter comprises:
generating a hierarchical representation of the gain map that has not been down-sampled by successive high-pass and low-pass filtering of the gain map to give a plurality of coefficient arrays in each of a plurality of levels, wherein the high-pass filter is [1,−1] and the low-pass filter is [1,1];
modifying coefficients of each of the coefficient arrays to give modified coefficient arrays, wherein the modifying the coefficients comprises mapping the coefficients with a piecewise linear function; and
inverse filtering each of the modified coefficient arrays to generate the filtered gain map.

5. The method of claim 4, wherein modifying the coefficients comprises thresholding the coefficients.

6. An apparatus configured to transform an N-bit raw wide dynamic range (WDR) Bayer image to a K-bit raw red-green-blue (RGB) image wherein N>K, the apparatus comprising:
means for converting the N-bit raw WDR Bayer image to an N-bit raw RGB image;
means for computing a luminance image from the N-bit raw RGB image;
means for computing a pixel gain value for each luminance pixel in the luminance image to generate a gain map;
means for applying a hierarchical noise filter to the gain map to generate a filtered gain map;
means for applying the filtered gain map to the N-bit raw RGB image to generated a gain mapped N-bit RGB image; and
means for downshifting the gain mapped N-bit RGB image by (N−K) to generate the K-bit RGB image.

7. The apparatus of claim 6, wherein
the means for converting the N-bit raw WDR Bayer image forms an RGB pixel value from each 2×2 block of Bayer data in the N-bit raw WDR Bayer image; and
the means for applying the filtered gain map interpolates the filtered gain map to a resolution of the N-Bit raw RGB image.

8. The apparatus of claim 6, wherein the means for computing a pixel gain value for each luminance pixel computes the pixel gain value as per $((inputPixel+1)/2^N)^t/((inputPixel+1)/2^N)$, wherein inputPixel is a value of the luminance pixel and t is an experimentally determined tuning parameter, and wherein when the pixel gain value is larger than an experimentally determined maximum gain value, the pixel gain value is set to the maximum gain value.

9. The apparatus of claim 6, wherein the means for applying a hierarchical noise filter:
generates a hierarchical representation of the gain map that has not been down-sampled by successive high-pass and low-pass filtering of the gain map to give a plurality of coefficient arrays in each of a plurality of levels, wherein the high-pass filter is [1,−1] and the low-pass filter is [1,1];
modifies coefficients of each of the coefficient arrays to give modified coefficient arrays, wherein the modifying the coefficients comprises mapping the coefficients with a piecewise linear function; and
inverse filters each of the modified coefficient arrays to generate the filtered gain map.

10. The apparatus of claim 9, wherein the means for applying a hierarchical noise filter modifies the coefficients by thresholding the coefficients.

11. A non-transitory computer readable medium storing software instructions that, when executed by at least one processor, cause a method of transforming by a digital system an N-bit raw wide dynamic range (WDR) Bayer image to a K-bit raw red-green-blue (RGB) image wherein N>K to be performed, the method comprising:
converting the N-bit raw WDR Bayer image to an N-bit raw RGB image;
computing a luminance image from the N-bit raw RGB image;
computing a pixel gain value for each luminance pixel in the luminance image to generate a gain map;
applying a hierarchical noise filter to the gain map to generate a filtered gain map;
applying the filtered gain map to the N-bit raw RGB image to generated a gain mapped N-bit RGB image; and
downshifting the gain mapped N-bit RGB image by (N−K) to generate the K-bit RGB image.

12. The non-transitory computer readable medium of claim 11, wherein
converting the N-bit raw WDR Bayer image comprises forming an RGB pixel value from each 2×2 block of Bayer data in the N-bit raw WDR Bayer image; and
applying the filtered gain map comprises interpolating the filtered gain map to a resolution of the N-Bit raw RGB image.

13. The non-transitory computer readable medium of claim 11, wherein computing a pixel gain value for each luminance pixel comprises computing the pixel gain value as per $((inputPixel+1)/2^N)^t/((inputPixel+1)/2^N)$, wherein inputPixel is a value of the luminance pixel and t is an experimentally determined tuning parameter, and wherein when the pixel gain value is larger than an experimentally determined maximum gain value, the pixel gain value is set to the maximum gain value.

14. The non-transitory computer readable medium of claim 11, wherein applying a hierarchical noise filter comprises:
generating a hierarchical representation of the gain map that has not been down-sampled by successive high-pass and low-pass filtering of the gain map to give a plurality of coefficient arrays in each of a plurality of levels, wherein the high-pass filter is [1,−1] and the low-pass filter is [1,1];
modifying coefficients of each of the coefficient arrays to give modified coefficient arrays, wherein the modifying the coefficients comprises mapping the coefficients with a piecewise linear function; and
inverse filtering each of the modified coefficient arrays to generate the filtered gain map.

15. The non-transitory computer readable medium of claim 14, wherein modifying the coefficients comprises thresholding the coefficients.

* * * * *